United States Patent [19]

Tronetti, Jr.

[11] Patent Number: 4,921,380
[45] Date of Patent: May 1, 1990

[54] FASTENER ASSEMBLY

[76] Inventor: Peter J. Tronetti, Jr., 101 Chippewa St., Royal Oak, Mich. 48073

[21] Appl. No.: 332,855

[22] Filed: Apr. 3, 1989

[51] Int. Cl.$^5$ .................................................. F16B 31/12
[52] U.S. Cl. ............................................ 411/8; 411/9; 411/12; 411/14
[58] Field of Search ................................ 411/8–14

[56] References Cited

U.S. PATENT DOCUMENTS

| | | | |
|---|---|---|---|
| 2,464,152 | 3/1949 | Ralston | 411/11 |
| 2,543,705 | 2/1951 | Place | 411/8 |
| 3,104,645 | 9/1963 | Harrison | 411/8 X |
| 3,183,762 | 5/1965 | Poupitch | 411/12 |
| 3,224,316 | 12/1965 | Grikscheit et al. | 411/13 |
| 3,622,167 | 11/1971 | Velthaven | 411/13 X |
| 3,718,066 | 2/1973 | Dally | 411/14 |
| 3,788,186 | 1/1974 | Crites | 411/8 |
| 3,825,912 | 7/1974 | Wiese et al. | 411/8 X |
| 3,834,269 | 9/1974 | Ohringer | 411/9 |
| 3,886,840 | 6/1975 | Bossler | 411/14 |
| 4,047,463 | 9/1977 | Coldren | 411/12 |
| 4,149,446 | 4/1979 | Spengler et al. | 411/11 |
| 4,303,001 | 12/1981 | Trungold | 411/531 X |
| 4,479,747 | 10/1984 | Pagel | 411/8 |
| 4,773,272 | 9/1988 | Trungold | 411/10 X |
| 4,793,751 | 12/1988 | Takeuchi et al. | 411/8 X |

FOREIGN PATENT DOCUMENTS

| | | | |
|---|---|---|---|
| 2538470 | 6/1984 | France | 411/8 |
| 699246 | 11/1979 | U.S.S.R. | 411/8 |
| 846823 | 7/1981 | U.S.S.R. | 411/11 |
| 872812 | 10/1981 | U.S.S.R. | 411/8 |
| 2106256 | 4/1983 | United Kingdom | 411/8 |

*Primary Examiner*—Gary L. Smith
*Assistant Examiner*—Suzanne L. Dino
*Attorney, Agent, or Firm*—Peter A. Taucher; David L. Kuhn

[57] ABSTRACT

Disclosed is a fastener assembly fixable to a structural member, the assembly having means to indicate the torque and clamping force of a bolt which forms part of the fastener assembly.

7 Claims, 3 Drawing Sheets

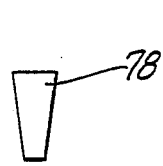
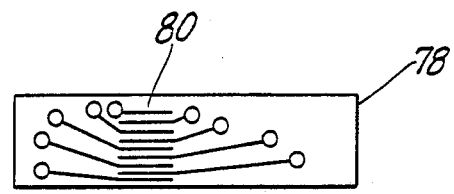
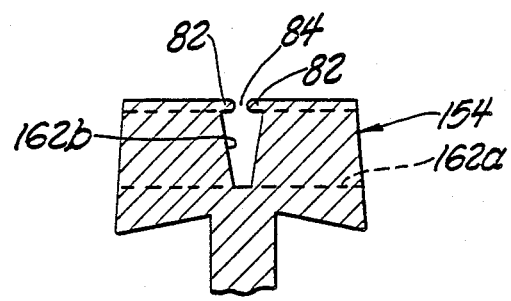
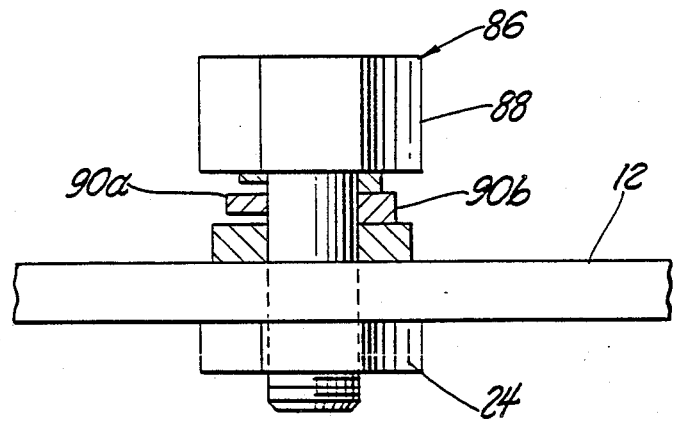

FASTENER ASSEMBLY

GOVERNMENT INTEREST

The invention described herein may be manufactured, used, and licensed by or for the Government for governmental purposes without payment to me of any royalty thereon.

BACKGROUND AND SUMMARY

The invention is a threaded fastener having means for visually indicating whether the fastener is tightened to a predetermined minimum torque.

In many mechanical devices, components are joined together by bolts or other threaded fasteners. Commonly it happens that these devices are subjected to mechanical and thermal stresses tending to separate the components, whereby the fasteners are strained sufficiently to lose tightness of grip. In these instances, the fasteners must be retorqued. Additionally, these fasteners often need to be periodically checked for proper torque to tightness.

In some applications, such as vehicle engine assemblies, transmissions, body structural elements, or suspension elements, the fasteners may be in relatively inaccessible locations. Often the fastener to be checked can not be reached by a torque wrench without substantial disassembly of the vehicle or its components. In some designs, therefore, space around the fasteners is purposely left open or free in order to facilitate access to these fasteners for torque testing. Such designs are not desirable for all vehicle applications, since space is often at a premium in vehicles.

In combat vehicles, for example, space for components is at a premium because the vehicle should have the smallest possible profile exposed to enemy fire. For armored vehicles, every extra cubic foot of vehicle space needs extra square area of armor, and hence more vehicle weight. Excess weight on armored vehicles, some of which weigh 60 tons already, causes a number of problems. These problems include inability to traverse over certain terrains or soils, reduced capacity to carry fuel and ammunition, reduced operating range, and reduced life of suspension and tank track components. Consequently, it is not generally practical to provide access space for fasteners for major components of armored vehicles.

Partial disassembly of armored vehicles to gain access to fasteners has disadvantages as well. Modern armored vehicles are quite complex, so that disassembly and reassembly is difficult and time consuming, especially since removal and replacement of armor plating may be necessary. Also, since armored vehicles are extremely heavy and of unique design, there are relatively few repair depots whose personnel and equipment can undertake disassembly or reassembly of such vehicles.

Applicant's invention is a fastener assembly designed to alleviate the difficulties associated with the need to test the torque or tightness of threaded fasteners on components in armored vehicles. The invention is a means to provide visual indication when the axial clamping force of a bolt or like fastener is above a given threshold, so the fasteners can be tested even when they are inaccessible to torque wrenches. The visual indication means can be configured to permit measurement of the clamping force and to prevent overtorquing of the fastener.

BRIEF DESCRIPTION OF THE DRAWINGS

FIG. 7 shows a modified bolt head for my fastener assembly.

FIG. 8 shows an embodiment of my invention conceptually similar to that shown in FIG. 1, except that FIG. 8 shows a coil spring instead of a spring washer. The left half of FIG. 8 shows the condition of a coil spring when the bolt is in a relatively low torque, low axial force condition and the right half of the figure shows the condition of a coil spring when the bolt is in a relatively high torque, high axial force condition.

DETAILED DESCRIPTION

Figure 1:
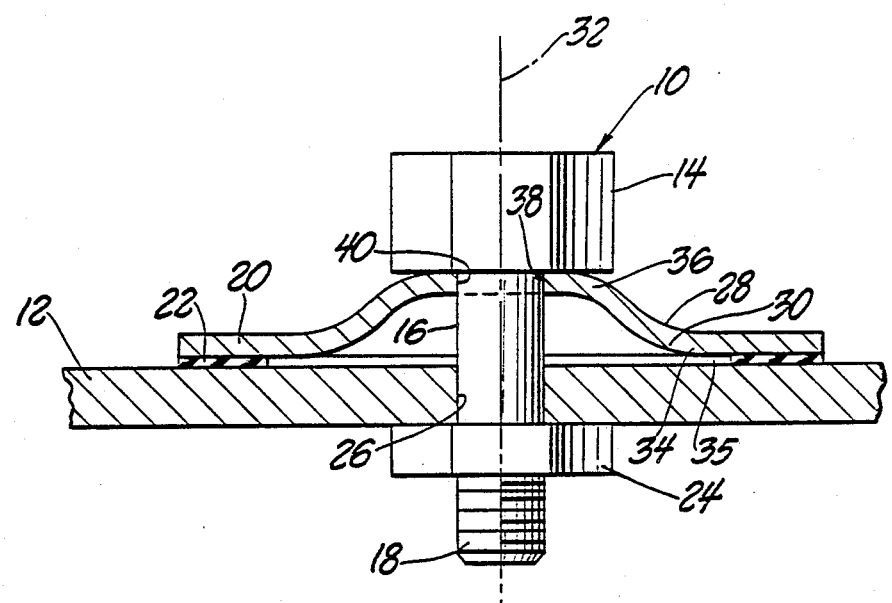
FIG. 1 is the first embodiment of my fastener assembly using a simple bolt and a specially designed spring washer.

Referring now to FIG. 1, there is shown a bolt 10 extending through a wall 12. The bolt preferably has either a hexagonal head as at 14 or a square head. Bolt 10 has a smooth, unthreaded shank 16 adjacent head 14 and a threaded portion 18 at the opposite end of shank 16 from the head. Between wall 12 and head 14 is a spring washer 20 and a flat annular spacer 22 of electrically nonconductive material. Spacer 22 is disposed at the circumferential edge of spring washer 20 between spring washer 20 and wall 12. A nut 24 threads onto end 18 of bolt 10, so that when nut 24 is tightened, spring washer 20 compresses. Optionally, nut 24 may either be fixed to wall 12 or can be eliminated if through hole 26 in wall 12 is threaded complimentarily to bolt 10. Bolt 10 is preferably made incapable of conducting electrical current to wall 12, as by making bolt 10 of stainless steel or by providing an appropriate nonconducting coating on the bolt. Spring washer 20 and wall 12 are both electrically conductive, and wall 12 is electrically grounded.

Spring washer 20 is essentially a convoluted disk having a first annular convolution or bend 28, the radially outer portion of this bend being closer to wall 12 than the radially inner portion of this bend. A point 30 at the central zone of bend 28 is approximately one-half to two-thirds the distance from bolt rotation axis 32 to the inner diametrical edge of spacer 22. The portion 34 of spring washer 20 radially between point 30 and the inner diametrical edge of spacer 22 is parallel to, or approximately parallel to, wall 12 and defines a narrow gap 35 with wall 20.

The central zone of spring washer 20 defines an orifice 40 to accommodate bolt 10. A zone 38 of spring washer 20 immediately surrounding orifice 40 bears conformingly against the underside of head 14. Immediately radially outward of zone 38 is another, inner convolution or bend 36 of spring washer 20. Bend 36 diverges increasingly from the underside of head 14 as the bend extends further from axis 32.

In operation, tightening bolt 10 compresses spring washer 20 from its FIG. 1 shape to a flatter shape. As spring washer is further compressed, eore and more of bend 36 bears against the under side of bolt head 14, whereby the size of the gap between the underside of bolt head 14 and spring washer 20 is an indication of the torque on bot 10. To assist the viewer in judging the size of the gap, a series of concentric markings centered on axis 32 can be placed in the area of bend 36 on spring washer 20. By observing how many of these markings are visible in the gap between bend 36 and the underside of bolt head 14, one can determine the torque or tightness of bolt 10. Depending on the particular application, the size of this gap can be an indicator of either the minimum or the maximum desired torque.

As spring washer 20 compresses, point 30 of the outer bend approaches contact with wall 12. At a predetermined torque or tightness of bolt 10, point 30 makes contact with wall 12, whereby an electrical current flowing into spring washer 20 can reach ground through wall 12. Consequently, one can determine whether the predetermined torque has been reached by touching spring washer 20 with an electrical probe 42 shown in FIG. 2. Again, depending on the particular application, contact between point 30 and wall 12 can occur at a minimum or a maximum torque or tightness of bolt 10.

Figure 2:
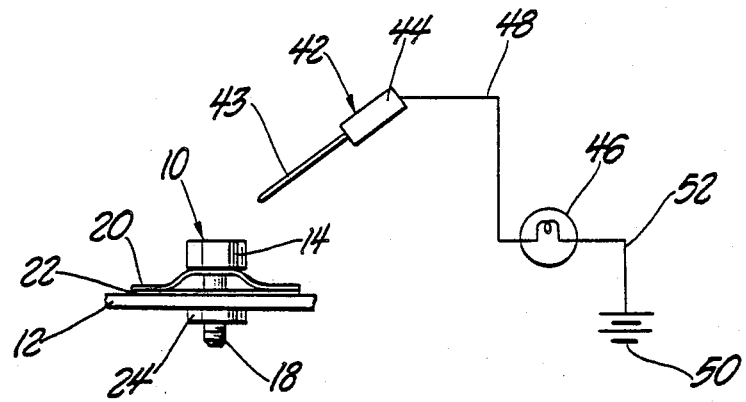
FIG. 2 is a semi-schematic electrical diagram of the an electrical probe and the first embodiment of my fastener assembly on which it is used.

In FIG. 2, probe 42 has a handle 44 and an elongate electrical contact 43 protruding therefrom. Electrically connecting probe 42 with light 46 is a line 48, and a source of power such as a set of cells 50 is connected to light 46 by means of line 52. If contact 43 is touched to spring washer 20 and if washer 20 is in direct contact with wall 12, then current from cells 50 can flow through light 46 to ground and light 46 illuminates.

Figure 3:
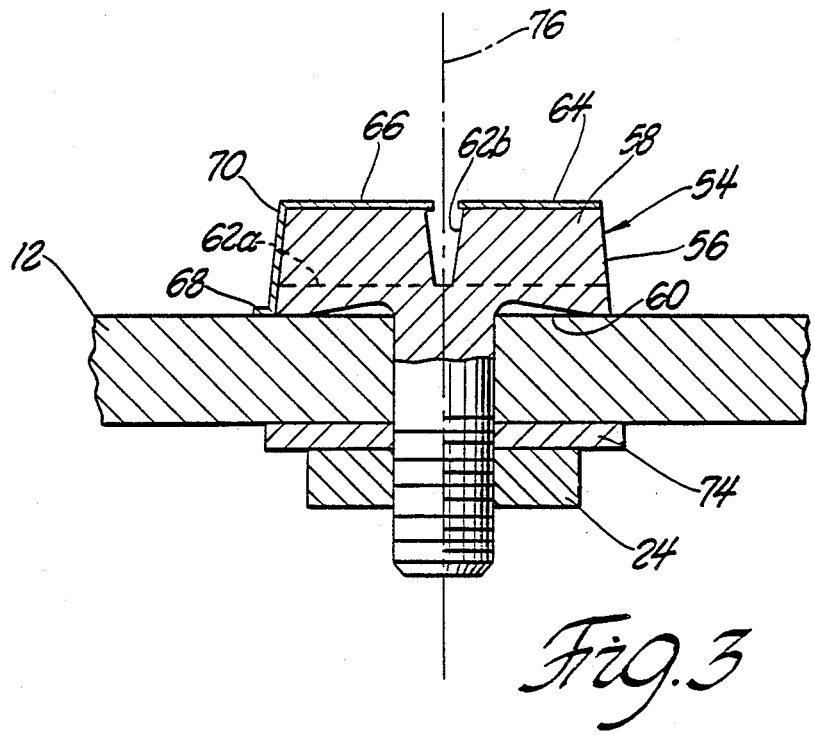
FIGS. 3 and 4 show a second embodiment of my fastener assembly, and FIGS. 5 ad 6 show a feeler gauge which can be used in conjunction with the second embodiment.
Figure 4:
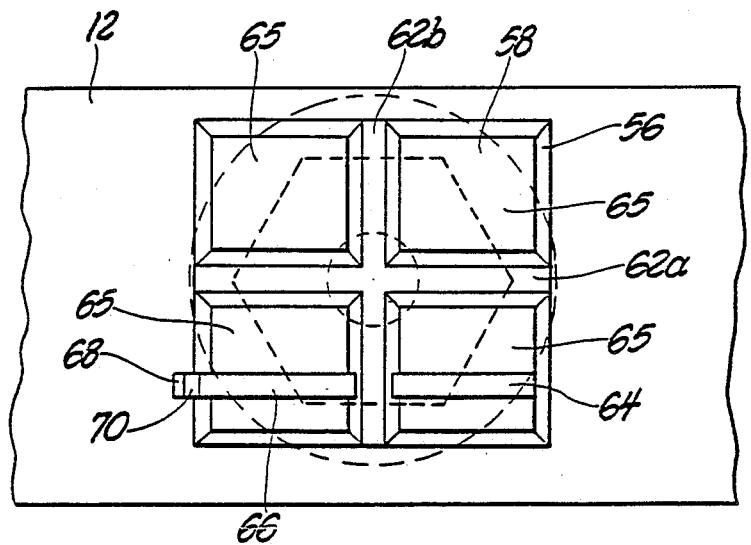

In FIGS. 3 and 4 is shown a second embodiment of my invention having a bolt 54 whose square head 58 has slightly sloped sides 56 so that the portion of head 58 more proximal to wall 12 is wider than the portion of the head more distal from wall 12. The clamping face 60 of head 58 is undercut so that face 60 defines with wall 12 a toroidal space having a radial cross-section shaped like a wedge, the toroidal space tapering in the radially outward direction. The peripheral edge of clamping face 60 bears against wall 12. Extending between pairs of opposed sides 56 of head 58 are V shaped grooves 62a and 62b which perpendicularly intersect to divide head 58 into four equal quadrants 65, as seen in FIG. 4. On two of the surfaces of head 58 faced away from wall 12 are electrically conductive strips 64 and 66, portions of which preferably extend toward each other past the edge of groove 62b. Integral with the end of strip 66 at the periphery of head 58 is a strip extension 70 disposed on one of the sides of the head, the strip extension including a flange 68 which contacts wall 12, Strip extension 70 may be inlaid in the side of head 58 in order to reduce the chance of damage to the extension when a wrench or like tool is used on bolt 54. On the opposite side of wall 12 from head 58 is nut 24 threaded to bolt 54 to fix bolt 54 and washer 74 to wall 12.

When bolt 54 is torqued or tightened, a clamping force is exerted by the bolt along bolt axis 76, this force elastically deforming head 58 so that the individual quadrants 65 pivot toward axis 76. As a consequence, the opposed walls in grooves 62a move together, as do the opposed sidewalls in groove 62b. The respective pairs of sidewalls move together by an amount which is a function of the torque or clamping force of bolt 54. The torque or clamping force can be measured by determining how deep a feeler gauge, such as gauge 78 in FIGS. 5 and 6, can be inserted into one of the grooves. When the sidewalls of groove 62b approach each other, conductive strips 64 and 66 also approach each other.

At a predetermined torque, the conductive strips make contact. The contacting of strips 64 and 66 can provide an indication either that a minimum threshold torque has been reached or that a maximum acceptable torque has been reached. In the particular embodiment of the invention shown in FIGS. 3 and 4, it is preferred that contacting of the strips will be an indication that a minimum torque has been reached. Also, assuming that wall 12 is electrically grounded, prove 42 (FIG. 2) can be touched to conductive strip 64 so that light 46 illuminates if strip 64 and 66 are in contact, whereby probe 42 can be used to determine whether a minimum acceptable torque has been reached.

As the torque or clamping force of bolt 54 increases, and as individual quadrants 65 of head 58 pivot toward axis 76, the slope of sidewalls 56 increases. As a consequence, it will become more difficult to keep a conventional box wrench, socket wrench or like tool engaged with head 58 as torque increases. Above a given torque, preferably the maximum acceptable torque for the bolt, it will be impossible to keep a wrench or like took engaged with head 58, whereby bolt 54 is protected from overtorquing.

FIGS. 5 and 6 show an example of a feeler gauge which can be used to determine how narrow grooves 62a and 62b are, and hence measure the torque on bolt 54. Gauge 78 includes a scale 80 comprised of a series of parallel spaced lines which can be labelled as is appropriate. The cross section of gauge 78 can be configured to conformingly fit into a groove when no torque has been applied to bolt 54. The gauge can be configured so that it can not enter groove 62b at all once a maximum torque has been reached; at the maximum torque, the sidewalls of the groove 62b can have moved so close together that no part of gauge 78 is narrow enough to fit therebetween.

FIG. 7 shows a modified bolt head 154 which is very similar to bolt head 54 in FIG. 3. Grooves 162a and 162b have basically the same configuration as corresponding grooves 62a and 62b in head 54. However, head 154 does not have conductive strips such as 64 and 66, whereas head 154 does include brim projections 82 all along the length of grooves 162a and 162b. Brim projections 82 extend from either groove sidewall toward one another and are preferably disposed at the entry or mouth 84 of the grooves. When torque is applied to bolt 154, head 154 elastically deforms so as to move brim projections 82 toward one another. At a predetermined torque, brim projections 82 will meet so as to provide a visual indication that the predetermined torque is being maintained on bolt 154. The sidewalls of grooves 162a and 162b can be coated with highly reflective or visible material, thereby making it easier to determine whether the brim projections 82 are closed together.

FIG. 8 shows still another embodiment of my invention wherein a conventional bolt 86 is fastened to a wall 12 by nut 24 or by threaded engagement in a through hole in wall 12. Between head 88 of bolt and wall 12 is a coil spring as at 90a or at 90b. The left half of FIG. 8 shows the condition of one coil spring 90a when bolt 86 is in a relatively low torque, how axial force condition wherein the individual coils of the spring are separated from one another. The right half of the figure shows the condition of coil spring 90b when bolt 86 is in a relatively high torque, high axial force condition such that the spring is compressed and the individual coils have collapsed together. Spring 90a or 90b preferably is a compound spring whose spring rate increases from one axial end to the other. The spring preferably has flat axially facing surfaces that bear against each other when the spring is completely compressed. The portions of these surfaces that so bear against each other can be coated or finished to make the portions highly visible when the spring expands and the coils separate. As torque on bolt 86 decreases from a level where the spring is fully compressed, the lower spring rated coils will separate faster than the higher rated coils, and the highly visible coatings or finishes on the lower rated coils will be seen before higher rated coils. As a consequence, the amount of highly visible coating or finish that can be seen on the axial faces of the coils will be an indication of the torque on bolt 86. Different coatings or finishes can be applied to coils or segments thereof having corresponding ranges of spring rates, so that the particular color or finish that can be seen on the axially facing surfaces of the coils will also be an indication of the torque on bolt 86.

I wish it to be understood that I do not desire to be limited to the exact details of construction shown and described, since obvious modifications will occur to a person skilled in the art without departing from the spirit and scope of the appended claims.

I claim:

1. bolt having means to indicate the amount of torque thereon when the bolt is threadingly fastened to a structural member, comprising
   a bolt head having one axially oriented surface whose peripheral edges contact the structural member, the one surface and the member defining therebetween a cross-sectionally wedge shaped space tapering in the generally radially outward direction away from the central longitudinal axis of the bolt;
   the bolt head having another axially oriented surface faced away from the one surface, the other surface defining therein a set of angularly spaced grooves passing through the central longitudinal axis of the bolt, the depth of the grooves being more than half the axial distance between the axially oriented surfaces of the head, the grooves defining sectors of the bolt head;
   wherein increasing clamping force of the bolt head against the structural member pivots the sectors of the bolt head toward the central longitudinal axis of the bolt so that the grooves narrow;
   electrically conductive elements on adjacent sectors, the elements extending toward one another over the groove between the adjacent sectors, the conductive elements being electrically insulated from one another except when brought together by pivoting of the adjacent sectors, so that contact between the conductive elements will occur when the bolt exerts a predetermined axial clamping force against the structural member.

2. The device of claim 1 wherein the width of the grooves narrows at a predictable, controlled rate which is a function of the increase in clamping force.

3. The device of claim 1 wherein the sidewalls of the grooves diverge in the axial direction away from the one surface toward the other surface, there being a cross-sectionally tapered feeler gauge insertable into the grooves to fit conformingly therein when the bolt is undeformed by axial clamping forces, the depth to which the gauge can be inserted into the groove decreasing as a predetermined function of the axial clamping force.

4. The device of claim 1 including a means for limiting the torque applicable by a wrench to the head of the bolt, the limiting means comprising a plurality of facets disposed between the axially oriented surfaces of the bolt head, the facets diverging from the central longitudinal axis of the bolt so that the edges of the facets at the one axially oriented surface are more distant from the axis than the edges of the facets at the other axially oriented surface, whereby the wrench slips off the head of the bolt when the wrench applies more than a predetermined amount of torque to the head.

5. A fastener assembly fixable to a structural member wherein the assembly visibly indicates the degree of fastening force applied by the assembly, comprising:
   a bolt having a head and an at least partially threaded shaft extending from the head, the head having a flat surface adjacent the shaft and faced toward the structural member;
   means to threadingly fasten the bolt to the structural member;
   a coil spring disposed between the flat surface and the structural member, the spring rate of the spring increasing from one axial end of the spring to the other axial end of the spring;
   the individual coils of the spring having flat axially directed faces that bear against one another as the spring is increasingly compressed, whereby the number of coils collapsed together is an indication of the axial force exerted by the head toward the structural member.

6. The device of claim 5 wherein the axially directed faces have surfaces of highly visible material, the coils of the spring within a given range of spring rates having facial surfaces visually distinct from facial surfaces of coils having another range of spring rates, whereby different sets of facial surfaces are visible for corresponding different ranges of clamping force exerted by the head on the spring.

7. A fastener assembly fixable to a structural member wherein the assembly visibly indicates the degree of fastening force applied by the assembly, comprising:
   a bolt having a head and an at least partially threaded shaft extending from the head, the head having a flat surface adjacent the shaft and faced toward the structural member;
   means to threadingly fasten the bolt to the structural member;
   a coil spring disposed between the flat surface and the structural member, the spring rate of the spring increasing from one axial end of the spring to the other axial end of the spring;
   the number of coils collapsed together being an indication of the axial force exerted by the head toward the structural member.

* * * * *